United States Patent
Coccolo et al.

(10) Patent No.: US 9,701,831 B2
(45) Date of Patent: Jul. 11, 2017

(54) PROCESS FOR PREPARING AN AQUEOUS POLYMER DISPERSION UNDER VACUUM, AND USES THEREOF

(71) Applicant: S.P.C.M. SA, Andrezieux Boutheon (FR)

(72) Inventors: Sebastien Coccolo, Lyons (FR); Bruno Tavernier, Saint Just Saint Rambert (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 197 days.

(21) Appl. No.: 14/053,995

(22) Filed: Oct. 15, 2013

(65) Prior Publication Data

US 2014/0194563 A1    Jul. 10, 2014

(30) Foreign Application Priority Data

Jan. 9, 2013 (FR) ...................................... 13 50180

(51) Int. Cl.
| | | |
|---|---|---|
| *C08F 2/20* | (2006.01) | |
| *C08L 33/26* | (2006.01) | |
| *C08L 33/02* | (2006.01) | |
| *C08F 220/06* | (2006.01) | |
| *C08F 220/34* | (2006.01) | |
| *C08F 220/56* | (2006.01) | |

(52) U.S. Cl.
CPC ............... *C08L 33/26* (2013.01); *C08F 2/20* (2013.01); *C08F 220/06* (2013.01); *C08F 220/34* (2013.01); *C08F 220/56* (2013.01); *C08L 33/02* (2013.01)

(58) Field of Classification Search
CPC ..... C08F 2400/00; C08F 2400/02; C08F 2/20
See application file for complete search history.

(56) References Cited

U.S. PATENT DOCUMENTS

| | | |
|---|---|---|
| 3,658,772 A | 4/1972 | Volk et al. |
| 4,929,655 A | 5/1990 | Takeda et al. |
| 5,605,970 A | 2/1997 | Selvarajan |
| 2002/0193546 A1* | 12/2002 | Freeman et al. ............. 526/310 |

FOREIGN PATENT DOCUMENTS

| | | | |
|---|---|---|---|
| DE | 145401 A | * 12/1980 | |
| EP | 1040141 B1 | 11/1998 | |
| FR | 2065077 | 10/1970 | |
| FR | 2240242 | 8/1974 | |
| FR | 2620717 A1 | 3/1989 | |
| JP | 11310615 A | * 11/1999 | ............. C08F 20/56 |

OTHER PUBLICATIONS

Machine Translation of JP 11-310615; Fujikake et al; Nov. 1999.*
Emulsion Polymerization; Wikipedia; 2011; Downloaded on Dec. 30, 2016.*
Dispersion Polymerization; Wikipedia; 2005; Downloaded on Dec. 30, 2016.*

* cited by examiner

*Primary Examiner* — Karuna P Reddy
(74) *Attorney, Agent, or Firm* — Heslin Rothenberg Farley & Mesiti P.C.

(57) ABSTRACT

Process for preparing an aqueous dispersion of hydrophilic polymers, according to which, in a reactor:
- a reaction medium is prepared in the form of an aqueous solution comprising water-soluble monomers, one or more salts and/or one or more dispersant organic polymers;
- the monomers are polymerized;
- the polymer obtained is discharged from the reactor;

wherein the pressure of the reaction medium is lowered to a value below 200 mbar.

22 Claims, No Drawings

PROCESS FOR PREPARING AN AQUEOUS POLYMER DISPERSION UNDER VACUUM, AND USES THEREOF

CROSS REFERENCE TO RELATED APPLICATIONS

This application claims priority of French Application No. 1350180 filed on Jan. 9, 2013, the entire contents of which is hereby incorporated by reference herein.

BACKGROUND ART

The invention relates to aqueous dispersions of hydrophilic polymers. These dispersions are obtained by polymerization in an aqueous solution of a mixture of monomers in the presence of a salt and/or of a polymer known as a stabilizer. They are also referred to as water-in-water dispersions.

Hydrophilic polymers are known to fulfill numerous functions, among the most important being their use as flocculant, as coagulant, as stabilizer, as thickener and as buoyancy agent. They are used in various forms and in various industrial sectors such as water treatment (urban, industrial and residual waters), paper and cardboard sheet manufacture, the petroleum industry (drilling, assisted recovery or EOR), and the processing of ores and various minerals such as fillers and pigments.

The polymerization technique leading to aqueous dispersions of hydrophilic polymers has been developed for many years.

This technique consists in performing the polymerization of a monomer or of a mixture of monomers in water containing a salt and/or other chemical agents such as dispersants in solution or in dispersion. Since the hydrophilic polymer formed during the polymerization is not soluble in the saline medium and/or contains dispersants, it precipitates when it reaches a sufficiently high molecular weight. At the end of the polymerization, a liquid dispersion of polymer particles suspended in the aqueous mixture is obtained.

This technique makes it possible very rapidly (within a few seconds) to dissolve the polymer in water during its use.

In U.S. Pat. No. 3,658,772, Dow Chemical describes dispersions obtained by copolymerization of acrylic acid and of another monomer in an aqueous solution containing the inorganic salts. The dispersion obtained is characterized by a highly acidic pH. The polymerization time is between 16 and 22 hours.

Many other patents have since been filed. The Hymo U.S. Pat. No. 4,929,655 describes a process for preparing an aqueous dispersion of hydrophilic polymer in an aqueous saline solution in the presence of a dispersant. The reaction time is 10 hours.

U.S. Pat. No. 5,605,970 repeats the Hymo process, incorporating into the dispersion a hydrophobic monomer. The polymerization times are between 18 and 24 hours.

Patent EP 1 040 141 also proposes a process for preparing aqueous dispersions for which the polymerization times are between 10 and 20 hours.

One of the problems of all these prior art processes is the very long preparation time, between 6 and 24 hours. This technological limit is explained by the need to perform the polymerization at reasonable temperatures generally of between 10 and 80° C., usually between 20 and 60° C. or, more precisely, between 30 and 50° C. approximately. Failing this, the viscosity of the reaction medium increases such that it irreversibly gels.

Cooling of the reaction medium is essential. It must be efficient and homogeneous, maintaining a temperature that is low enough not to bring about viscosification of the medium, which would be detrimental to the production of an aqueous dispersion.

The problem that the invention proposes to solve is that of reducing the preparation time for aqueous dispersions of hydrophilic polymer.

BRIEF DESCRIPTION OF THE INVENTION

The Applicant has discovered, surprisingly and entirely unexpectedly, that the problem is solved by performing the polymerization at low pressure or under vacuum, and more specifically at a pressure below 200 mbar, and preferentially under vacuum.

The term "under vacuum" corresponds to a pressure much lower than atmospheric pressure, generally an "industrial" pressure, i.e. a pressure that can be achieved industrially by primary or even secondary vacuum pumps.

The Applicant has also discovered that the polymerization time is very significantly reduced when the aqueous reaction medium is boiling during the polymerization.

Without being bound to a particular theory, it appears that the evacuation of the heat during the boiling enables more efficient and homogeneous cooling of the medium, thus making it possible to accelerate the polymerization. The Applicant has also observed that, all conditions being otherwise equal, this novel process makes it possible to increase the polymer concentration in the dispersion.

One subject of the present invention is a process for preparing an aqueous dispersion of hydrophilic polymers by polymerization, in which the polymerization is partially or totally performed at a pressure below 200 mbar.

More specifically, a subject of the invention is a process for preparing an aqueous dispersion of hydrophilic polymers, according to which, in a reactor:
- a reaction medium is prepared in the form of an aqueous solution comprising at least water-soluble monomers, one or more salts and/or one or more dispersing organic polymers;
- the monomers are polymerized;
- the polymer obtained is discharged from the reactor.

According to this process, the pressure of the reaction medium is lowered to a value below 200 mbar, preferably to a pressure of between 1 and 100 mbar and advantageously to a pressure such that the reaction medium boils.

This pressure reduction may be performed at various moments in the process according to the methods mentioned hereinbelow by way of example. In other words, the pressure reduction may be applied throughout all or part of the duration of the preparation of the dispersion.

In practice, the reaction medium is prepared at atmospheric pressure, and the pressure of said reaction medium is lowered to a value at least below 200 mbar throughout all or part of the duration of the polymerization.

According to a preferred mode, the aqueous reaction medium is boiling during all or part of the polymerization.

In a preferred embodiment, the pressure of the reaction medium has a value of between 0.1 mbar and 100 mbar and preferentially between 1 mbar and 60 mbar.

The term "hydrophilic polymer" means water-soluble polymers, water-swelling polymers and hydrophilic polymers that may comprise hydrophobic chains.

Additional steps of degassing with nitrogen and of heating to the reaction temperature may be added to the steps described previously.

At the end of the polymerization, the reactor is returned to atmospheric pressure in order to discharge the dispersion. It is also possible to maintain a pressure below 200 mbar during the discharge and during the storage of the dispersion. Under these conditions, the contents are maintained at low pressure, which also makes it possible to improve the stability of the dispersion.

During the boiling, an amount of water evaporates, thus allowing diffusion of the heat of the reaction, and consequently more efficient cooling of the reaction medium. This also makes it possible to obtain a secondary advantage, which is that of concentrating the polymer solution.

The polymerization temperature is generally between 10 and 80° C., preferentially between 15 and 50° C. and even more preferentially between 20 and 40° C. The viscosity of the reaction medium remains low by virtue of the low pressure and a better controlled and more uniform temperature throughout the medium, whether it is close to the walls of the reactor or at the center of the reaction bath.

The means for lowering the pressure are all the known means, without this being limiting. Examples that may be mentioned include membrane, vane or piston vacuum pumps.

The polymerization is performed in a leaktight reactor that is capable of maintaining the low pressure necessary for the process.

The polymerization is generally initiated after depressurizing the reactor, but may also be initiated before or during the pressure reduction step. The depressurization step generally lasts a few seconds, or even a few minutes, depending on the volume of the reactor, and depending on the equipment used to achieve the vacuum.

According to one particular embodiment, the following are thus successively performed:
the reaction medium is prepared at atmospheric pressure,
the pressure of said reaction medium is lowered,
the polymerization is initiated.

In another embodiment, the following are successively performed:
the reaction medium is prepared at atmospheric pressure,
simultaneously, the pressure of said reaction medium is lowered and the polymerization is initiated.

In another embodiment, the following are successively performed:
the reaction medium is prepared at atmospheric pressure,
the polymerization is initiated,
the pressure of said reaction medium is lowered during the polymerization.

The organic or inorganic salts for rendering insoluble the polymer prepared in the aqueous phase may be added in a single portion or in several portions. Generally, a first addition is made in the aqueous solution before the start of the polymerization. In the case of multiple additions, the additional additions of salt may be performed either by breaking the vacuum and returning to atmospheric pressure, or, preferably, by adding the salts under vacuum, the container of the salts itself being under vacuum, said vacuum being close to that of the reaction medium. The advantage of a gradual addition of salts is that it promotes gradual precipitation of the polymer formed and better stabilization of said polymer in the aqueous phase. The same procedure may be adopted as regards the addition of the monomers, the dispersants or other compounds.

The aqueous solution comprises water-soluble monomers bearing an ethylenic double bond chosen from the following families:

Anionic monomers. They are advantageously chosen from the group comprising monomers bearing a carboxylic function (e.g. acrylic cid, methacrylic acid, and salts thereof, etc.), monomers bearing a sulfonic acid function (e.g. 2-acrylamido-2-methylpropanesulfonic acid (AMPS) and salts thereof, etc.);

Nonionic monomers. They are advantageously chosen from the group comprising acrylamide and methacrylamide, acrylamide derivatives such as N-alkylacrylamides, for example N-isopropylacrylamide, N-tert-butylacrylamide, and also N,N-dialkylacrylamides such as NN-dimethylacrylamide and N-methylolacrylamide. Vinylformamide, N-vinylpyridine, N-vinylpyrrolidone, hydroxyalkyl acrylates and methacrylates, and (meth)acrylates bearing chains of the alkoxy type may also be used. The preferred nonionic monomers are acrylamide, NN-dimethylacrylamide, and N-vinylpyrrolidone;

Cationic monomers. They are preferably chosen from the group comprising diallyldialkylammonium salts such as diallyldimethylammonium chloride (DADMAC) and also dialkylaminoalkyl acrylates and methacrylates, in particular dialkylaminoethyl acrylate (DAMEA) and dialkylaminoethyl methacrylate (DAMEMA), and also forms thereof acidified or quaternized via the means known to those skilled in the art, and also dialkylaminoalkyl-acrylamides or -methacrylamides, and also forms thereof acidified or quaternized in a known manner, for example (meth)acrylamidopropyltrimethylammonium chloride;

Monomers of zwitterionic type may also be used; they combine both anionic and cationic charges on the same monomer. Examples of zwitterionic monomers that may be mentioned include: sulfobetaine monomers such as sulfopropyl dimethylammonium ethyl methacrylate, sulfopropyl dimethylammonium propylmethacrylamide, sulfopropyl 2-vinylpyridinium, phosphobetaine monomers such as phosphatoethyltrimethylammonium ethyl methacrylate, and carboxybetaine monomers.

Without departing from the scope of the invention, in combination with these monomers, other monomers may also be used, especially hydrophobic or hydrophilic monomers of hydrophobic nature: examples that will be mentioned include styrene, alkyl(meth)acrylates, aryl(meth) acrylates, and hydrophobic acrylamide derivatives. The polymers obtained via the process according to the invention are linear, branched, comb or crosslinked polymers or polymers of any other known structure. Preferentially, the polymers are linear or branched.

One way of obtaining a branched or crosslinked polymer consists in using a branching/crosslinking agent during or after the polymerization, optionally in combination with a transfer agent. In a nonlimiting manner, the branching/crosslinking agents that may be used comprise agents of ionic type, such as polyvalent metal salts, formaldehyde, glyoxal or, preferably, agents of covalent type that copolymerize with the monomers and preferably polyethylenically unsaturated monomers (having a minimum of two unsaturated functions), for instance vinyl, allylic, acrylic and epoxy functions (for instance methylenebisacrylamide (MBA)). In practice, the branching agent is introduced in a proportion of from five to one thousand (5 to 1000) mol per million moles of monomers, preferably 5 to 200.

A nonlimiting list of transfer agents is given herein: isopropyl alcohol, sodium hypophosphite, mercaptoethanol.

The monomer concentration in the aqueous solution is generally between 5% and 50% by weight and preferentially between 15% and 35% by weight.

The polymers obtained via the process are anionic, cationic, nonionic or amphoteric (co)polymers, which are soluble in water or swellable in water when they are branched or crosslinked.

Any organic or inorganic salt for rendering insoluble the prepared polymer may be used according to the invention. Preferred salts are those comprising sulfate, dihydrogen phosphate, phosphate and halide anions. The corresponding cations may be sodium, potassium, ammonium, magnesium or aluminum. The simultaneous use of two or more of these salts is also possible.

When the salt is present, the salt concentration in the aqueous solution corresponds at most to the maximum salt solubility, preferentially between 5% and 35% by weight and even more preferentially between 8% and 27% by weight.

The dispersing or stabilizing organic polymer is generally a polymer with a molecular weight of between 1000 and 500 000 g/mol. It may be chosen from the anionic, cationic or amphoteric (co)polymers obtained from the nonionic, anionic and/or cationic monomers mentioned previously. In general, the stabilizing polymers of the invention have a molecular weight lower than that of the main polymer, and preferentially between 10 000 and 300 000 g/mol.

The stabilizing polymers that are particularly preferred are anionic or amphoteric (co)polymers obtained from 2-acrylamido-2-methyl-1-propanesulfonic acid (AMPS) or salts thereof or (meth)acrylic acid or salts thereof and copolymers obtained from these monomers.

Stabilizing polymers that may also be used include (co) polymers based on diallyldialkylammonium salts, such as diallyldimethylammonium chloride (DADMAC), dialkylaminoalkyl acrylates and methacrylates, in particular dialkylaminoethyl acrylate (DAMEA) and dialkylaminoethyl methacrylate (DAMEMA), and also forms thereof acidified or quaternized by the means known to those skilled in the art, dialkylaminoalkyl-acrylamides or -methacrylamides, and also forms thereof acidified or quaternized in a known manner, for example (meth)acrylamidopropyltrimethylammonium chloride.

The concentration of dispersing or stabilizing organic polymer in the aqueous solution, when it is present, is generally less than 30% by weight and preferentially between 5% and 20% by weight.

Certain additives known to those skilled in the art may also be used. Mention will be made of polyfunctional alcohols such as glycerol, polyethyleneglycol, and polypropyleneglycol. Polyalkylene ethers may also be used.

The concentration of one of these additives such as the polyfunctional alcohols in the aqueous phase is generally between 0 and 20% by weight and preferentially between 0 and 10% by weight. The use of a single stabilizer or of a mixture of stabilizers is also possible.

The use of one or more salts combined with one or more dispersing organic polymers, and optionally combined with another additive of the polyfunctional alcohol type, is also possible and generally preferred for obtaining aqueous dispersions of good stability.

The polymerization is initiated by any means known to those skilled in the art. Mention may be made especially of redox couples, azo compounds and light radiation such as ultraviolet.

A person skilled in the art will know how to select the best combination as a function of his own knowledge and of the present description.

The polymers obtained via the process according to the invention have a molecular weight of between 100 000 and 30 000 000 g/mol, and preferentially less than 20 000 000 g/mol.

A subject of the present invention is also the use of the aqueous dispersions of hydrophilic polymer obtained via the process according to the invention in the following industries: the paper industry (as a secondary retention agent, draining agent, etc.), water treatment (drinking water or wastewater), all coagulation or flocculation techniques in general, the mining industry, the petroleum industry (enhanced oil recovery, reduction of pressure drops or reduction of friction), the cosmetic products industry, the textile industry, the detergent products industry, and all similar applications that will be obvious to a person skilled in the art. Other characteristics and advantages of the invention will emerge more clearly on reading the description and the nonlimiting examples that follow.

DETAILED DESCRIPTION

The invention and the advantages flowing therefrom will emerge from the following examples.

Example 1

105 g of an aqueous 12% solution of a dispersing copolymer of acrylic acid and of ATBS, 195.2 g of an aqueous 50% solution of acrylamide, 42.4 g of acrylic acid, 98 g of ammonium sulfate, 10.5 g of glycerol, 4.2 g of a 50% NaOH solution, 1 g of an aqueous solution containing 50 g/L of sodium bromate, 0.7 g of formate and 213.3 g of water are mixed together and then degassed with nitrogen, and finally heated to 35° C. with stirring. The pH of the solution is set at 3.6. The pressure inside the reactor is lowered to reach 43 mbar. 12 g of sodium metabisulfite are then added slowly throughout the polymerization. Since the heat evolved by the polymerization reaction is absorbed by the evaporation of about 87 g of water, the reaction was able to be completed in 2 hours 30 minutes. This is test D.

Other tests A, B and C were performed. The results are collated in Table 1.

Test A corresponds to a polymerization of a water-in-water dispersion as is performed in the prior art, i.e. at atmospheric pressure and over a long time, 10 hours.

In test B, the Applicant attempted to accelerate the reaction while maintaining atmospheric pressure, but by adding the metabisulfite more rapidly, such that this amount is added regularly over a period of 2 hours 30 minutes. This led to a gel within the first hour.

In test C, the Applicant succeeded in significantly reducing the polymerization time to 3 hours 30 minutes by adjusting the pressure to 80 mbar.

Test D gives the best results, with a polymerization time divided fourfold relative to the conventional polymerization time.

Processes of tests A, C and D lead to stable dispersions.

These tests also show the advantage of the process according to the invention since it also makes it possible to increase the polymer concentration in the dispersion. This increase is significant since it corresponds to a 14% increase in concentration.

TABLE 1

| Test | Pressure | Polymerization time | State of the final product | Polymer concentration |
|---|---|---|---|---|
| A | 1 bar | 10 h | Dispersion | 20% |
| B | 1 bar | N.A. | Gel | N.A. |
| C | 80 mbar | 3 h 30 min | Dispersion | 22.8% |
| D | 43 mbar | 2 h 30 min | Dispersion | 22.8% |

N.A.: not applicable

Example 2

64.8 g of an aqueous 20% solution of a dispersant copolymer of DAMEA and of DADMAC, 121.5 g of an aqueous 50% solution of acrylamide, 42.7 g of an aqueous 80% solution of quaternized dialkylaminoethyl acrylate (DAMEA), 161 g of ammonium sulfate, 4.2 g of glycerol, 1.6 g of an aqueous solution containing 50 g/l of sodium bromate, 0.45 g of formate, 12.6 g of an aqueous 80% solution of chlorobenzylated dialkylaminoethyl acrylate (DAMEA) and 251.3 g of water are mixed together and then degassed with nitrogen, and are then heated to 35° C. with stirring. The pH of the solution is between 4 and 5. The pressure in the reactor is lowered to reach 41 mbar, and 12 g of sodium metabisulfite are added slowly throughout the polymerization. Since the heat evolved by the polymerization reaction is absorbed by the evaporation of about 43 g of water, the reaction was able to be completed in 2 hours 30 minutes. This is test H.

Other tests E, F and G were performed. The results are collated in Table 2.

Test E corresponds to a polymerization of a water-in-water dispersion as is performed in the prior art, i.e. at atmospheric pressure and over a long time, 10 hours.

In test F, the Applicant attempted to accelerate the reaction while conserving atmospheric pressure, but by adding the metabisulfite more rapidly, such that this amount is added regularly over a period of 2 hours 30 minutes. This led to a gel within the first hour.

In test G, the Applicant succeeded in significantly reducing the polymerization time to 3 hours 15 minutes by adjusting the pressure to 77 mbar.

Test H gives the best results, with a polymerization time divided fourfold relative to the conventional polymerization time.

The processes of tests E, G and H lead to stable dispersions.

These tests also show the advantage of the process according to the invention since it also makes it possible to increase the polymer concentration in the dispersion.

TABLE 2

| Test | Pressure | Polymerization time | State of the final product | Polymer concentration |
|---|---|---|---|---|
| E | 1 bar | 10 h | Dispersion | 20% |
| F | 1 bar | N.A. | Gel | N.A. |
| G | 77 mbar | 3 h 15 min | Dispersion | 21.3% |
| H | 41 mbar | 2 h 30 min | Dispersion | 21.3% |

N.A.: not applicable

The invention claimed is:

1. A process for preparing an aqueous dispersion of hydrophilic polymer, in a reactor, the process comprising: preparing a reaction medium of an aqueous solution comprising at least water-soluble monomers, one or more salts and/or one or more dispersing organic polymers;
polymerization of the monomers; and
discharge from the reactor of an aqueous dispersion of hydrophilic polymer obtained from the polymerization;
wherein the reaction medium is prepared at atmospheric pressure, and pressure of the reaction medium is lowered to a value below 200 mbar throughout all or part of the duration of the polymerization, whereby concentration of the hydrophilic polymer in the aqueous dispersion is increased while polymerization time is decreased compared to polymerization at atmospheric pressure.

2. The process as claimed in claim 1, wherein the pressure of the reaction medium is lowered to a value such that the reaction medium boils.

3. The process as claimed in claim 1, wherein the pressure of the reaction medium is lowered to a value of between 0.1 mbar and 100 mbar.

4. The process as claimed in claim 1, wherein the following steps are successively performed:
the reaction medium is prepared at atmospheric pressure,
the pressure of said reaction medium is lowered, and
the polymerization is initiated.

5. The process as claimed in claim 1, wherein the following steps are successively performed:
the reaction medium is prepared at atmospheric pressure,
simultaneously, the pressure of said reaction medium is lowered and the polymerization is initiated.

6. The process as claimed in claim 1, wherein the following steps are successively performed:
the reaction medium is prepared at atmospheric pressure,
the polymerization is initiated, and
the pressure of said reaction medium is lowered throughout the duration of the polymerization.

7. The process as claimed in claim 1, wherein the polymerization occurs at a temperature between 10 and 80° C.

8. The process as claimed in claim 1, wherein the water-soluble monomers contain an ethylenic double bond and are chosen from the following families:
anionic monomers chosen from the group consisting of monomers bearing a carboxylic function, monomers bearing a sulfonic acid function, and salts thereof;
nonionic monomers chosen from the group consisting of acrylamide and methacrylamide, acrylamide derivatives, vinylformamide, N-vinylpyridine, N-vinylpyrrolidone, hydroxyalkyl acrylates and methacrylates, and (meth)acrylates bearing chains of the alkoxy type;
cationic polymers chosen from the group consisting of diallyldialkylammonium salts, dialkylaminoalkyl acrylates and methacrylates, and also the acidified or quaternized forms thereof, and dialkylaminoalkyl-acrylamides or -methacrylamides, and also the acidified or quaternized forms thereof.

9. The process as claimed in claim 1, wherein concentration of the monomer in the aqueous solution is between 5% and 50% by weight.

10. The process as claimed in claim 1, wherein the one or more salts are chosen from those comprising sulfate, dihydrogen phosphate, phosphate and halide anions, and comprising sodium, potassium, ammonium, magnesium or aluminum as the corresponding cations.

11. The process as claimed in claim 1, wherein concentration of the one or more salts in the aqueous solution corresponds at most to maximum salt solubility.

12. The process as claimed in claim 1, wherein the one or more dispersing organic polymers comprise polymers with a molecular weight of between 1000 and 500 000 g/mol.

13. The process as claimed in claim 1, wherein concentration of the one or more dispersing organic polymers in the aqueous phase is less than 30% by weight.

14. The process of claim 1, further comprising use of the aqueous dispersion of hydrophilic polymer in at least one of the following: paper industry, water treatment, coagulation or flocculation techniques, mining industry, petroleum industry, cosmetic products industry, textile industry, and detergent products industry.

15. The process as claimed in claim 1, wherein the pressure of the reaction medium is lowered to a value of between 1 mbar and 60 mbar.

16. The process as claimed in claim 1, wherein the polymerization occurs at a temperature between 20 and 40° C.

17. The process as claimed in claim 1, wherein concentration of the monomers in the aqueous solution is between 15% and 35% by weight.

18. The process as claimed in claim 1, wherein concentration of the one or more salts in the aqueous solution corresponds to between 5% and 35% by weight.

19. The process as claimed in claim 1, wherein concentration of the one or more salts in the aqueous solution corresponds to between 8% and 27% by weight.

20. The process as claimed in claim 1, wherein concentration of the one or more dispersing organic polymers in the aqueous solution is between 5% and 20% by weight.

21. The process as claimed in claim 1, wherein the duration of polymerization is 3.5 hours or less.

22. The process as claimed in claim 1, wherein the dispersing organic polymer is a polymer that is an anionic, cationic or amphoteric.

* * * * *